(No Model.) 2 Sheets—Sheet 1.

A. BLATCHLY & A. J. HATCH.
FRUIT DRIER.

No. 325,782. Patented Sept. 8, 1885.

Witnesses,
Geo. H. Strong
J. H. _____

Inventors,
A. Blatchly.
A. J. Hatch
By Dewey & Co.
Attorneys (No Model.) 2 Sheets—Sheet 2.

A. BLATCHLY & A. J. HATCH.
FRUIT DRIER.

No. 325,782. Patented Sept. 8, 1885.

UNITED STATES PATENT OFFICE.

AMBROSE BLATCHLY AND ANDREW J. HATCH, OF SAN FRANCISCO, CAL.

FRUIT-DRIER.

SPECIFICATION forming part of Letters Patent No. 325,782, dated September 8, 1885.

Application filed May 25, 1885. (No model.)

*To all whom it may concern:*

Be it known that we, AMBROSE BLATCHLY and ANDREW J. HATCH, of the city and county of San Francisco, State of California, have invented an Improvement in Driers; and we hereby declare the following to be a full, clear, and exact description of the same.

Our invention relates to a desiccating or drying apparatus which is more especially useful and applicable to the drying of fruit.

It consists of a long chamber or chambers having vertical diaphragms or partitions at intervals, with leaves or shutters formed in them, by which the current of air which passes through the chamber from the furnace situated at one end to the suction-fan or draft apparatus at the opposite end may be regulated and the current thrown upward or downward, as desired. Cars carrying trays to receive the fruit are caused to run in and out of these chambers, which are provided with suitable doors.

Figure 1:
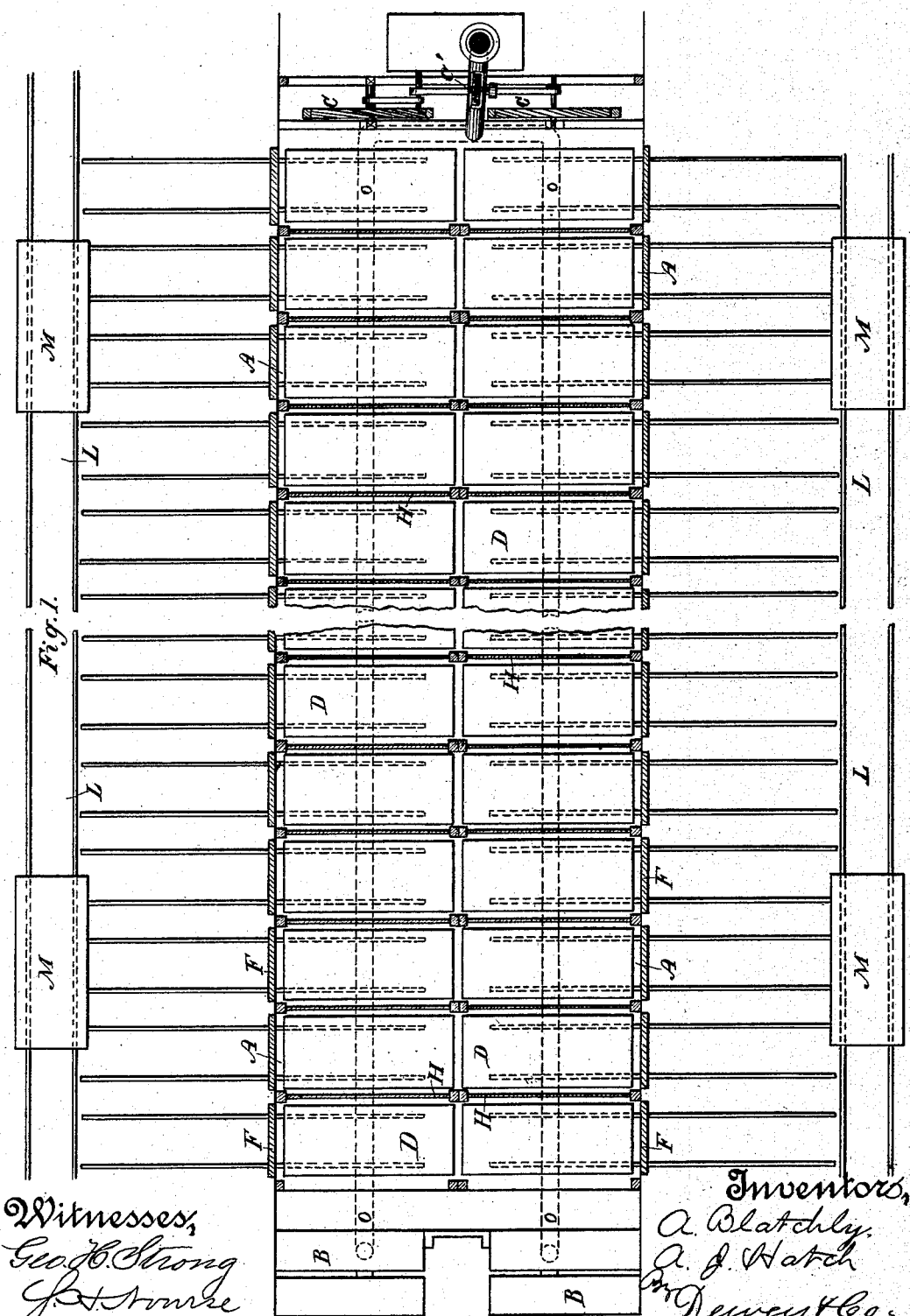
Figure 2:
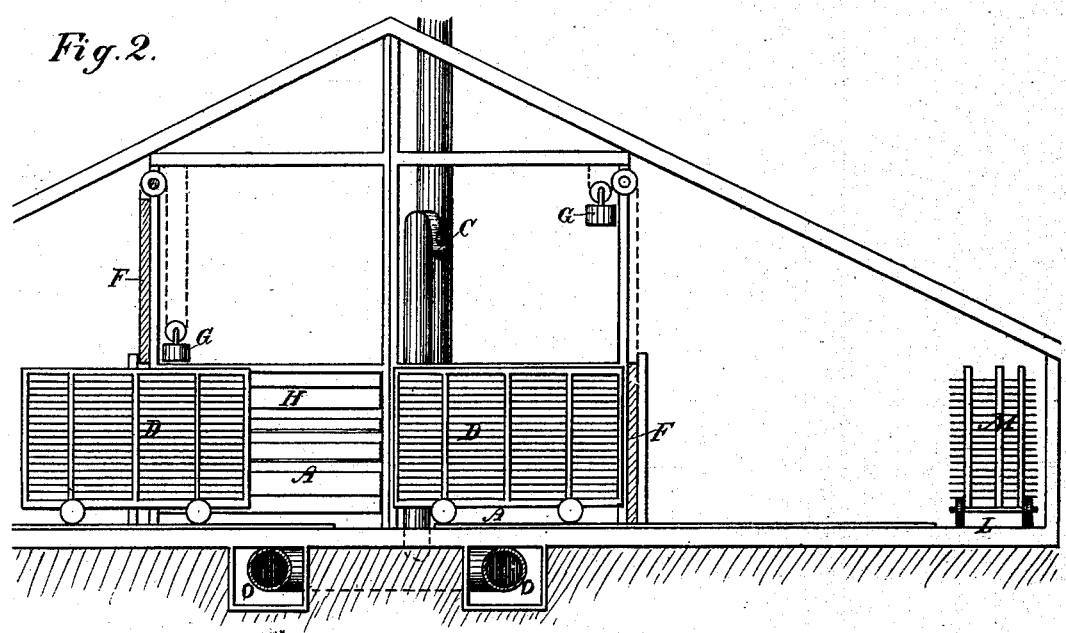
Figure 3:
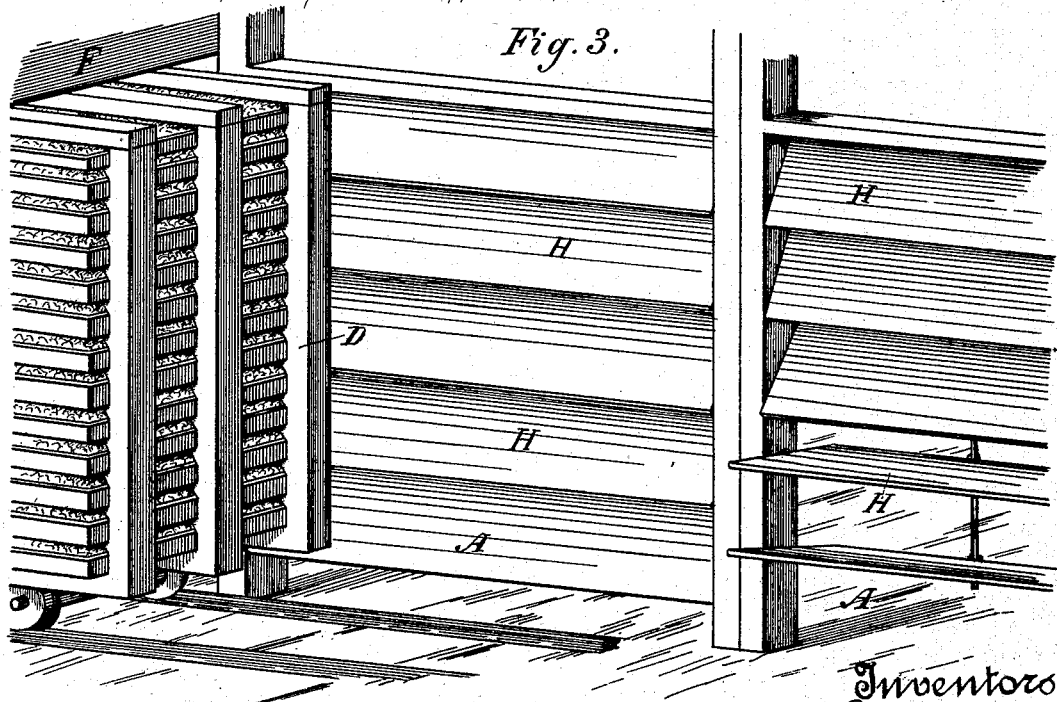

Referring to the accompanying drawings for a more complete explanation of our invention, Figure 1 is a horizontal section of the apparatus. Fig. 2 is a transverse section. Fig. 3 is an enlarged view showing the valves or shutters in the diaphragm or walls intervening between the chambers, and also the cars.

A A are the chambers, which are placed side by side, such a number of them being placed together as will form a long apparatus.

At one end of the apparatus is a heater, B, and at the opposite end of the apparatus are draft or suction wheels C, or other suitable mechanism which is driven by an engine or other power, so that it will draw the heated air from one end of the apparatus to the other.

The chambers A are made of such size as will allow one car, D, to enter each chamber at right angles to the air-current, there being a track or roadway upon which the car may travel for this purpose.

Each car is provided with uprights and supporting-cleats, upon which the trays of fruit may be arranged until it is filled from the bottom to the top, and when the car has been wheeled into the chamber it very nearly or quite fills it.

In front of each of the chambers A is a gate, F, which slides in vertical guides, as shown in Fig. 2, and may have a counterbalance-weight, G, so that it can be easily moved. When this gate has been raised, the car will run into or out of the chamber, after which the gate may be again closed.

The walls or partitions between the chambers are composed of or provided with shutters or valves H, which may be suitably connected by cords or otherwise, so that they can be opened or closed at will. It is desirable to arrange these shutters so that they may be moved independently or in sections for the upper, central, and lower portion of the wall. It will be manifest that these shutters being all closed upon each side of a chamber, the movement of the heated air from the heaters to the exhaust end will be temporarily arrested, and, if found desirable, the suction apparatus may be temporarily stopped for this purpose. When the shutters have been closed upon both sides of any chamber, the door may be opened and the car withdrawn or introduced without in any way affecting the adjoining chambers.

A tramway, L, extends along parallel with the front of the chambers, and upon this supply-cars containing prepared fruit travel, so that when a car, D, has been run out of its chamber the completed trays may be removed and a new supply of trays or fruit taken from the supply-cars and placed upon the drying-car, which is again run into the chamber.

The valves or shutters may be again opened after the door has been closed behind the car, and the current thus re-established through the whole series.

The tendency of the warm air being to rise to the top of the chambers, this is also counteracted, and the air is directed to any desired part of the chambers by opening and setting the shutters either in the upper, middle, or lower section, so that they will act as deflectors to the air which is passing through.

It will be manifest that the number of chambers in the series can be increased as long as the current of air can be profitably drawn through them; and it will also be manifest that a second series of chambers can be arranged so that the rear wall of one series answers for both. In this case two heaters may be used, or the air from one heater may be directed into both series of chambers, if desired.

The products of combustion from the furnace pass through pipes or passages o, which extend beneath the chambers to the rear end, where they are connected with the chimney. A fan-blower, C', at this point provides a sufficient draft for the purpose, and as the pipes or passages are made of conducting material the heat from them rises into the chambers and assists in the work.

Having thus described our invention, what we claim as new, and desire to secure by Letters Patent, is—

1. A drying apparatus consisting of a series of chambers formed by the partitions and valves or shutters H, and cars carrying fruit-trays adapted to run into or out of chambers at right angles to the air-current, vertically-sliding doors which may be opened and closed to admit and confine the cars, a heater at one end of the series, and an exhaust apparatus at the opposite end, whereby currents of air may be drawn through the fruit-trays, substantially as herein described.

2. In a drying apparatus, a series of chambers arranged horizontally side by side, and adapted to receive tray-supporting cars, and vertically-sliding doors for their admission and exit, in combination with valves or shutters arranged in the walls between the chambers, and a controlling mechanism whereby the shutters may be opened, closed, or adjusted to deflect the heated air to any point, substantially as herein described.

In witness whereof we have hereunto set our hands.

AMBBOSE BLATCHLY.
ANDREW J. HATCH.

Witnesses:
GEO. H. STRONG,
S. H. NOURSE.